(No Model.)
L. B. MOORE & M. S. LOVE.
PLANT PROTECTOR.
No. 436,183. Patented Sept. 9, 1890.
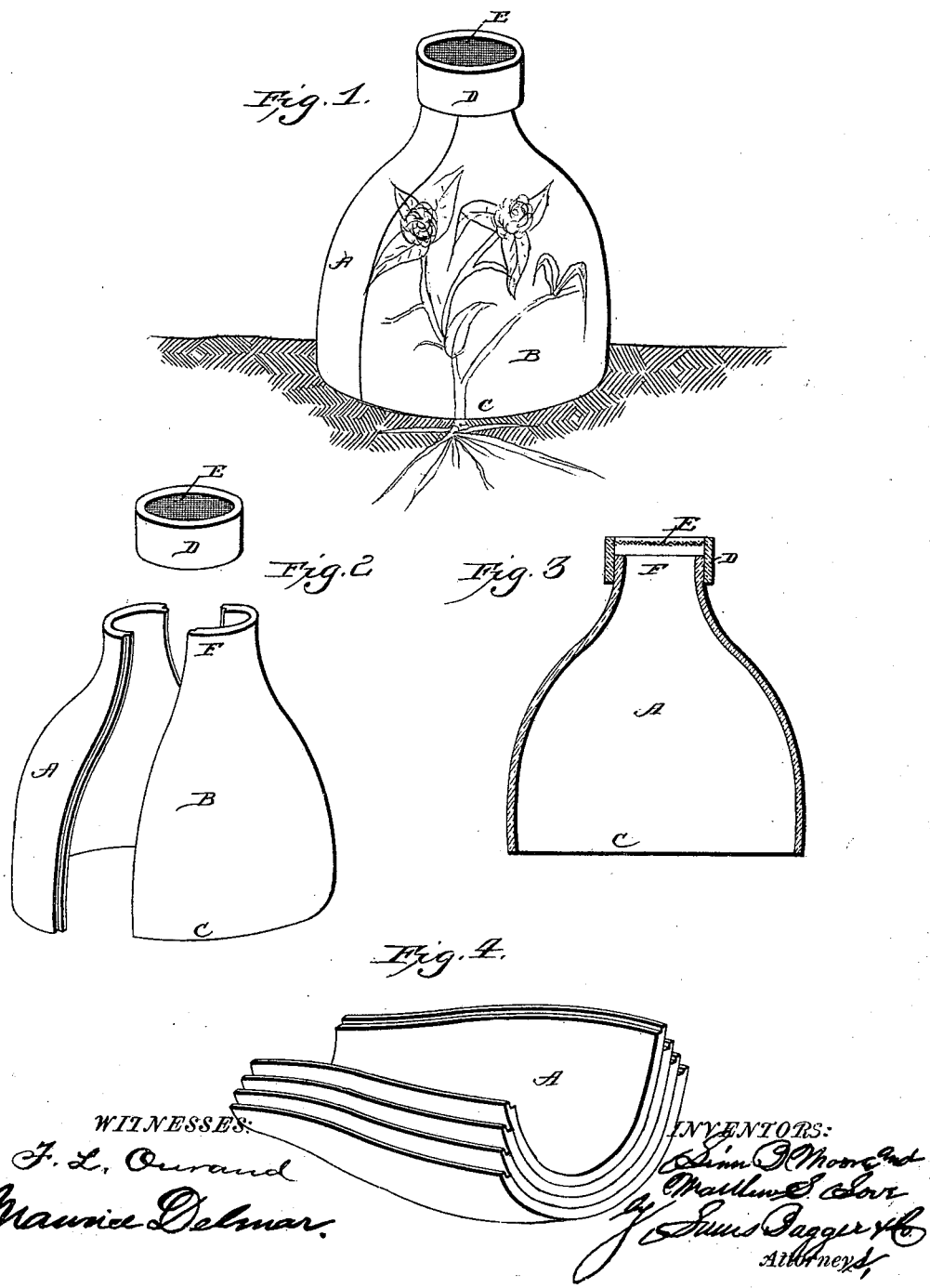

UNITED STATES PATENT OFFICE.

LINN BOYD MOORE AND MATTHEW SILAS LOVE, OF MORLEY, MISSOURI.

PLANT-PROTECTOR.

SPECIFICATION forming part of Letters Patent No. 436,183, dated September 9, 1890.

Application filed March 18, 1890. Serial No. 344,361. (No model.)

*To all whom it may concern:*

Be it known that we, LINN BOYD MOORE and MATTHEW SILAS LOVE, both residents of Morley, in the county of Scott and State of Missouri, have invented certain new and useful Improvements in Plant-Protectors; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of our improved plant-protector, showing the same in its operative position. Fig. 2 is a perspective view showing the three parts of our improved protector separated from one another. Fig. 3 is a vertical sectional view through the middle of the device, and Fig. 4 is a perspective view showing the manner in which the halves which constitute the body of the protector may be nested together when packed for storage or transportation, so as to occupy but little space.

Like letters of reference denote corresponding parts in all the figures.

This invention relates to plant-protectors of that class which are designed to protect young plants from the inclemencies of the weather and from the attacks of vermin; and it consists in the improved construction and combination of parts of a translucent protector of that type, as will be hereinafter more fully described and claimed.

Our improved protector consists of three parts, two of these parts A and B constituting when put together the body of the protector. These two parts are exactly the same shape, and may be made in the same mold, so as to form when put together edgewise a pear-shaped box, the base C of which rests upon or is embedded into the soil around the growing plant. It is obvious, however, that instead of making this main part or body A B of a pear shape, as shown in the drawings, it may be made in the shape of a truncated cone or of any other suitable shape or configuration having a wide base and sloping sides converging toward the top.

After the parts A and B have been placed together around the plant, so as to inclose the same on all sides, a cap D is placed over the open top, said cap having a top of wire-gauze E. This top or cap D fits closely around the contracted upper part or neck F of the device, and serves to keep the two parts A and B together, the perforated top E admitting moisture to the growing plant and also permitting the vapors which are engendered inside of the protector to escape.

The two parts A and B are preferably made of glass, mica, oil-paper, or of any other translucent material which will admit light to the growing plant. The cap D may be made of the same material, or it may be made conveniently of metal.

From the foregoing description, taken in connection with the drawings, the advantages of this improved construction will readily be understood. By constructing the main part or body A B in two separate parts or sections instead of in one piece, they may be placed around the growing plant with greater ease, and in such a manner as to absolutely avoid abrasion or injury to the tender leaves of the plant. Another advantage is that this peculiar construction of the body permits of the parts or sections being readily nested together for shipment or storage, as shown in the drawings, and if one of the parts should become broken another section or part may be readily substituted, as they are all of the same size and configuration.

Having thus described our invention, we claim and desire to secure by Letters Patent of the United States—

In a plant-protector, the combination, with the sections A and B contracted to form a neck, of the removable cap D, having wire-gauze top E, and adapted to fit over the neck or contracted part of the body or sections A and B, substantially as described.

In testimony that we claim the foregoing as our own we have hereunto affixed our signatures in presence of two witnesses.

LINN BOYD MOORE.
MATTHEW SILAS LOVE.

Witnesses:
JOSIAH PATTERSON,
ALFRED DE WITT.